US006966005B2

(12) United States Patent
Bohrer et al.

(10) Patent No.: US 6,966,005 B2
(45) Date of Patent: Nov. 15, 2005

(54) ENERGY CACHING FOR A COMPUTER

(75) Inventors: Patrick Joseph Bohrer, Austin, TX (US); Charles Robert Lefurgy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 10/027,125

(22) Filed: Dec. 26, 2001

(65) Prior Publication Data
US 2003/0120959 A1     Jun. 26, 2003

(51) Int. Cl.[7] .......................... G06F 1/26; G06F 11/30; G06F 11/00; H02J 7/00

(52) U.S. Cl. .......................... 713/300; 713/340; 714/4; 307/64

(58) Field of Search ..................... 713/300, 320, 713/340

(56) References Cited

U.S. PATENT DOCUMENTS

| | | | |
|---|---|---|---|
| 4,860,185 A | | 8/1989 | Brewer et al. |
| 5,396,635 A | | 3/1995 | Fung |
| 5,500,561 A | * | 3/1996 | Wilhelm ..................... 307/64 |
| 5,964,879 A | * | 10/1999 | Dunstan et al. ............. 713/340 |
| 6,023,148 A | | 2/2000 | Pignolet |
| 6,502,203 B2 | * | 12/2002 | Barron et al. ................... 714/4 |

OTHER PUBLICATIONS

Jacob R. Lorch and Alan Jay Smith, "Software Strategies for Portable Computer Energy Management," *IEEE Personal Communications*, Jun. 1998, pp. 60-73 (available at http://www-2.cs.cmu.edu/afs/cs.cmu.edu/user/satya/Web/mcsalink/papers/lorch98.pdf.).

Jason Flinn and M. Satyanarayanan, "PowerScope: A Tool for Profiling the Energy Usage of Mobile Applications," 1999, available from the School of Computer Science, Carnegie Mellon University, Pittsburgh, Pennsylvania. (available at http://www-2.cs.cmu.edu/afs/cs/project/coda/Web/docdir/pscope99.pdf.).

Jason Flinn, Dushyanth Narayanan and M. Satyanarayanan, "Self-Tuned Remote Execution for Pervasive Computing," 2001, available from the School of Computer Science, Carnegie Mellon University, Pittsburgh, Pennsylvania. (available at http://www.cs.cmu.edu/~jflinn/papers/hotos.pdf.).

* cited by examiner

*Primary Examiner*—Lynne H. Browne
*Assistant Examiner*—Stefan Stoynov
(74) *Attorney, Agent, or Firm*—Joseph P. Lally; Casimer K. Salys

(57) ABSTRACT

The following are provided for example: methods comprising determining a value for an energy condition affecting at least one computer in a cluster; updating said value continuously; comparing said value with a predefined limit regarding said energy condition; and utilizing at least one energy mode such as storing energy, or operating the computer on stored energy. Systems for executing such methods, and instructions on a computer-usable medium for executing such methods, also are provided for example.

27 Claims, 3 Drawing Sheets

ENERGY CACHING FOR A COMPUTER

FIELD OF THE INVENTION

The present invention relates to methods and systems for energy management for computers.

BACKGROUND OF THE INVENTION

Various approaches to handling computers' energy requirements have been proposed in the past, including for example U.S. Pat. No. 5,964,879, Method and System for Dynamically Power Budgeting with Device Specific Characterization of Power Consumption Using Device Driver Programs, (Dunstan et al, Oct. 12, 1999) and U.S. Pat. No. 5,396,635, Power Conservation Apparatus Having Multiple Power Reduction Levels Dependent upon the Activity of the Computer System, (Fung, Mar. 7, 1995). However, these examples do not make good use of possibilities for energy storage, and do not address external variables such as energy prices.

Energy—related problems in computing include increasingly dense concentrations of computers, that may make existing electrical wiring inadequate in some buildings. Supplying adequate current to dense clusters of computers may be difficult and costly, especially considering the current required when computers are handling a peak work load. There are additional problems in some utility markets, where energy may have variable pricing, or where the reliability of the energy supply may be variable, depending on the time of day or other factors. There is a need for systems and methods that address such energy—related problems.

SUMMARY OF THE INVENTION

An example of a solution to problems mentioned above comprises determining a value for an energy condition affecting at least one computer in a cluster; updating said value continuously; comparing said value with a predefined limit regarding said energy condition; and utilizing at least one energy mode such as storing energy, or operating the computer on stored energy.

Consider some further examples, such as using the external AC to charge a battery during an off-peak energy—consumption period; and supplying energy from the battery to one or more computers during a peak energy—consumption period. Another example is monitoring the price of the external AC; using the external AC to charge a battery when the price is relatively low; and supplying energy from the battery to one or more computers when the price is relatively high.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Figure 1:
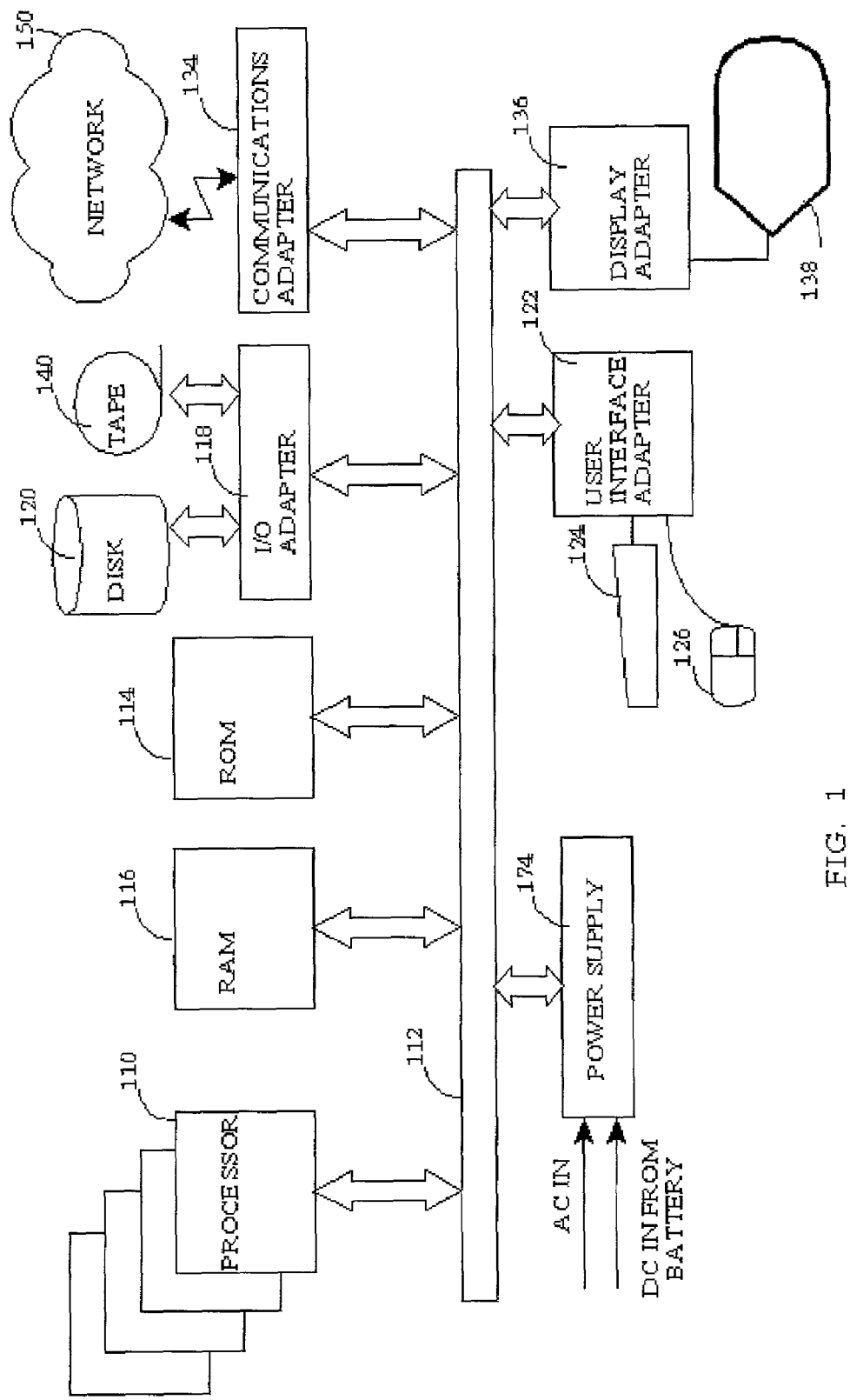
FIG. 1 illustrates a simplified example of a computer system capable of performing the present invention.

The examples that follow involve the use of one or more computers and may involve the use of one or more communications networks. The present invention is not limited as to the type of computer on which it runs, and not limited as to the type of network used. The invention may be implemented in servers for example, or any other computers that may be arranged together in clusters or racks. Another example is a high-performance computer comprising a cluster of smaller computers, such as a BEOWULF cluster or one of the supercomputers built by IBM, such as IBM's RS/6000 SP. The invention may be implemented in any environment where energy consumption is important.

Useful background information on computers' energy consumption may be found in the following articles, even though they emphasize portable computers. Reference is made to an article by Jacob R. Lorch and Alan Jay Smith, "Software Strategies for Portable Computer Energy Management," *IEEE Personal Communications*, June 1998, pages 60–73. This article contains information on software and hardware issues (including battery technology) that may be useful for implementing the present invention. Reference also is made to an article by Jason Flinn and M. Satyanarayanan, "PowerScope: A Tool for Profiling the Energy Usage of Mobile Applications," 1999, available from the School of Computer Science, Carnegie Mellon University, Pittsburgh, Pa. This article describes some possible software and hardware approaches to quantifying a computer's energy consumption. Reference also is made to an article by Jason Flinn, Dushyanth Narayanan and M. Satyanarayanan, "Self-Tuned Remote Execution for Pervasive Computing," 2001, available from the School of Computer Science, Carnegie Mellon University, Pittsburgh, Pa. This article describes some possible software and hardware solutions to predict resource availability and demand, including the use of smart batteries with chips that report data about energy use and the amount of charge left in a battery. A decision engine for selecting a best execution mode also is described.

The following are definitions of terms used in the description of the present invention and in the claims:

"Cluster" means a group of two or more computers that work together.

"Comparing" means bringing together for the purpose of finding any likeness or difference, including a quantitative likeness or difference. "Comparing" may involve answering questions including but not limited to: "Is the present time within time limits defined as a peak energy—consumption period?" Or "Is the present energy price greater than a predefined limit?" Or "Is the present time within time limits defined as having a reliable energy supply?"

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Energy condition" means any external or internal factor regarding supply of energy to a computer, including but not limited to time of day, price of energy, rate of energy consumption, and amount of stored energy.

"Energy mode" means any way of using hardware and software for managing energy use.

"External energy" means any energy from a source external to a computer, such as a building's energy supply.

"Node" means a processor or a computer in a cluster.

"Server" means any computer that provides a service, in a client-server model. Examples of such a service include but are not limited to: information services, transactional services, access to databases, and access to audio or video content.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

FIG. 1 illustrates a simplified example of an information handling system that may be used to practice the present invention. The invention may be implemented on a variety of hardware platforms, including embedded systems, personal computers, workstations, or servers. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet. The system has power supply 174, which is connected to bus 112, and which may receive control signals via bus 112. Power supply 174 receives power from a battery and from a source of alternating current (AC), such as a building's AC power supply cables. Power supply 174 supplies electrical currents, via electrical power lines included with bus 112, to the system's components and devices. Power supply 174 may include hardware and software for providing energy data to the system, and for controlling the system's energy use.

While the computer system described in FIG. 1 is capable of executing the processes described herein, this computer system is simply one example of a computer system. Those skilled in the art will appreciate that many other computer system designs are capable of performing the processes described herein.

Figure 2:
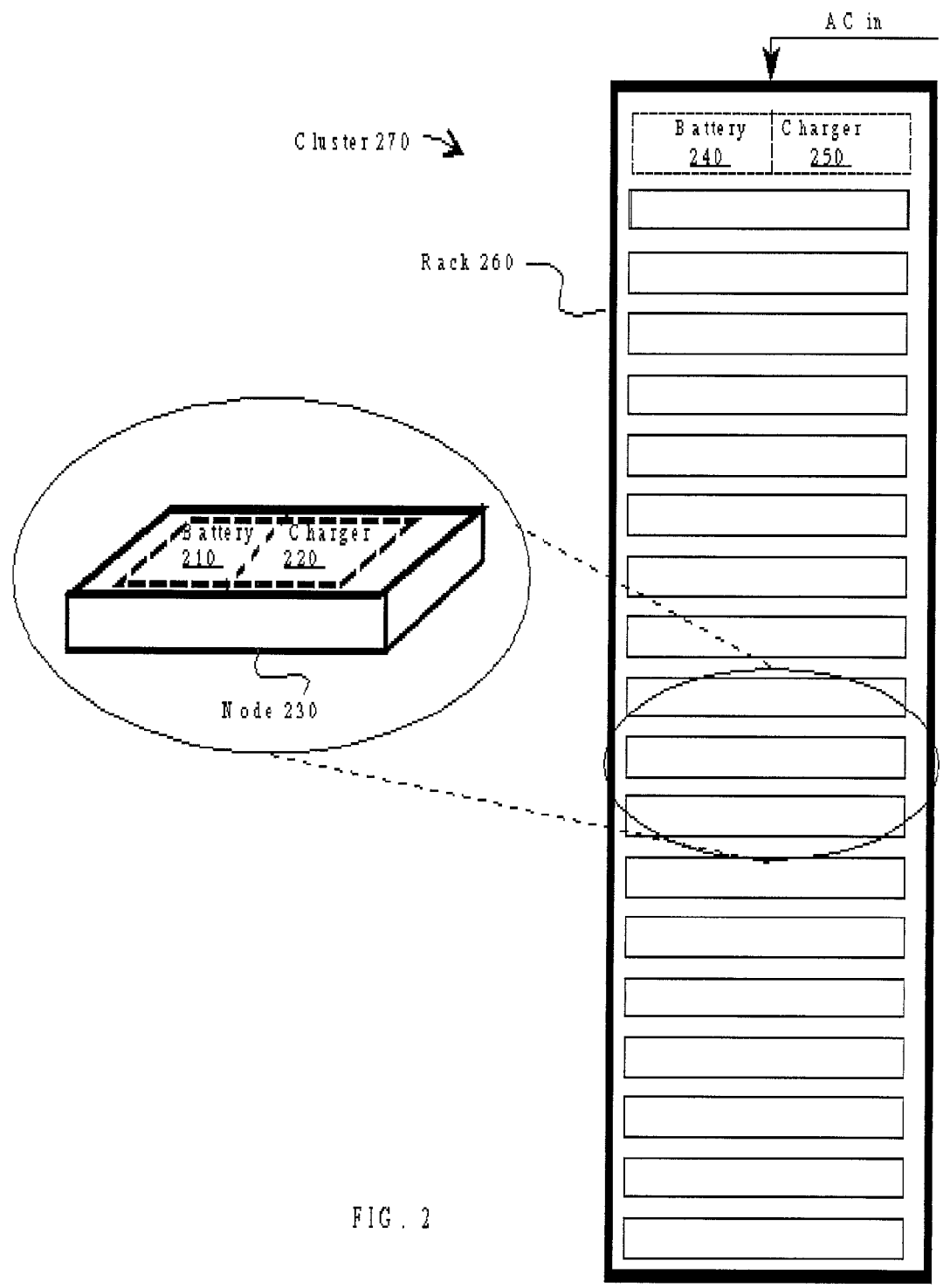
FIG. 2 is a diagram illustrating an example of a cluster having a number of nodes, and showing some possible locations for a battery and a battery charger, according to the teachings of the present invention.

FIG. 2 is a diagram illustrating an example of a cluster 270, having a number of computers or nodes such as node 230. FIG. 2 shows some possible locations for a battery and a battery charger, according to the teachings of the present invention. A battery 210 and a battery charger 220 may be positioned in node 230, for example. Thus each computer, like node 230, may have its own battery, like battery 210. A battery 240 and a battery charger 250 may be positioned in rack 260, as another example. Thus a plurality of computers may share a battery mounted in rack 260. Typically cluster 270 would have an external energy source, such as power lines for AC (shown at top right).

Thus FIG. 2 shows some possible ways to implement a method comprising: monitoring a computer's (node 230's) energy consumption; supplying external AC to said computer (node 230) during an off—peak energy—consumption period; using said external AC to charge a battery (210 or 240) during said off—peak energy—consumption period; and supplying energy from said battery (210 or 240) to said computer (node 230) during a peak energy—consumption period. FIG. 2 also shows some possible ways to implement a method comprising: monitoring the price of said external AC; using said external AC to charge a battery (210 or 240) when said price is less than a first price limit; and supplying energy from said battery (210 or 240) to said computer (node 230) when said price is greater than a second price limit. FIG. 2 also shows some possible ways to implement a method comprising: monitoring the amount of energy stored in said battery (210 or 240); and using said external AC to charge said battery (210 or 240) when said amount of energy is less than a predefined lower limit.

Figure 3:
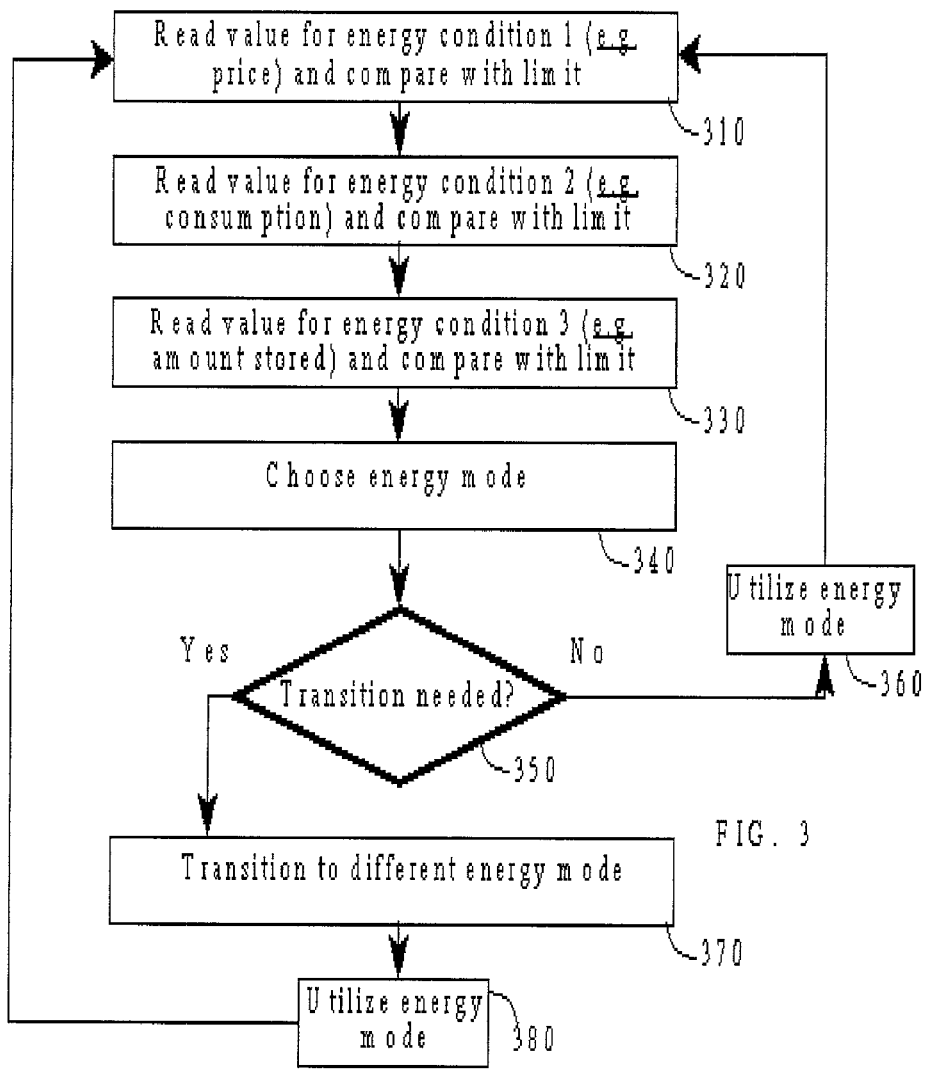
FIG. 3 is a flow chart illustrating an example of a method for energy management.

FIG. 3 is a flow chart illustrating an example of a method for energy management. Blocks 310, 320, and 330 each involve determining a value for an energy condition affecting at least one computer in a cluster, and comparing said value with a predefined limit regarding said energy condition. At block 310, a value for energy condition 1 (energy price for example) is read and compared with a limit regarding that energy condition. At block 320, a value for energy condition 2 (energy consumption for example) is read and compared with a limit regarding that energy condition. At block 330, a value for energy condition 3 (amount of stored energy for example) is read and compared with a limit regarding that energy condition. Based on this determining and comparing, an energy mode is chosen at block 340. If the chosen mode is the same as the present mode, no transition is needed, and the "No" branch is taken at decision 350. Then at block 360, the chosen energy mode is utilized; this may involve utilizing an energy mode chosen from: storing energy; operating said at least one computer on stored energy; operating said at least one computer on external energy; and standing by, for example. See also FIG. 4. The process continues at block 310, updating the values continuously.

On the other hand, if the chosen mode is not the same as the present mode, a transition is needed, and the "Yes" branch is taken at decision 350. At block 370, a transition is made to another energy mode. Then at block 380, the chosen energy mode is utilized; this may involve utilizing an energy mode chosen from: storing energy; operating said at least one computer on stored energy; operating said at least one computer on external energy; and standing by, for example. See also FIG. 4. The process continues at block 310, updating the values continuously.

Consider some examples of energy conditions, decisions, and utilizing energy modes. Note that in the decision process, inputs might include more than one energy condition, as shown in FIG. 3. One possible energy condition is a price for energy; the chosen mode may be operating on stored energy, when said price is greater than the predefined limit. The energy condition may be a price for energy; and the chosen mode may be storing energy, when said price is less than a predefined lower limit. The energy condition may be a price for energy; and the chosen mode may be operating on external energy, when said price is less than a predefined lower limit.

Another possible energy condition is a rate of energy consumption; and the chosen mode may be operating on stored energy, when said rate is greater than the predefined limit. The energy condition may be a rate of energy consumption; and the chosen mode may be storing energy, when said rate is less than a predefined lower limit. The energy condition may be a rate of energy consumption; and the chosen mode may be operating on external energy, when said rate is less than a predefined lower limit.

Another possible energy condition is an amount of stored energy (in one or more batteries); and the chosen mode may be storing energy, when said amount of stored energy is less than a predefined lower limit.

Those skilled in the art will recognize that blocks in the above-mentioned flow chart could be arranged in a somewhat different order, but still describe the invention. Blocks could be added to the above-mentioned flow charts to describe details, or optional features; some blocks could be subtracted to show a simplified example.

Figure 4:
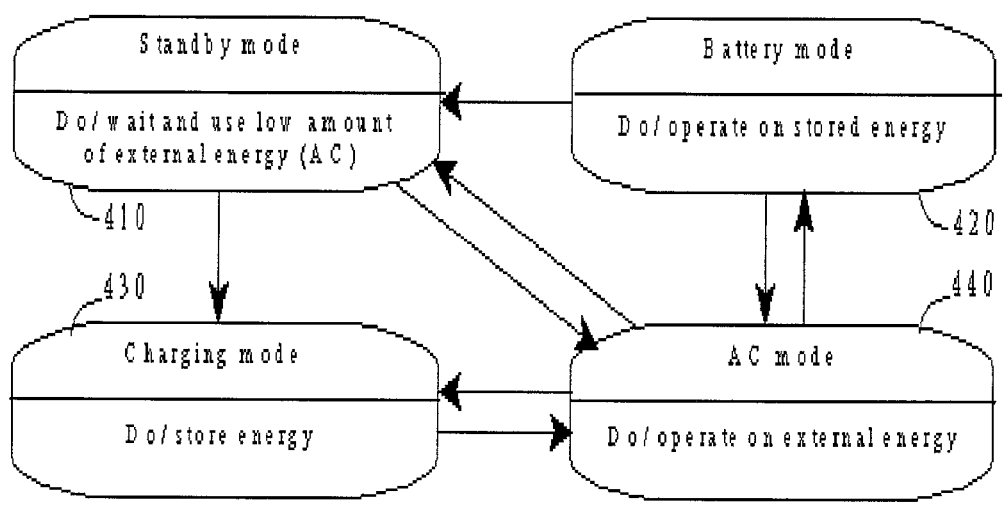
FIG. 4 is a diagram illustrating examples of some energy modes that could be used according to the teachings of the present invention.

FIG. 4 is a diagram illustrating examples of some energy modes that could be used according to the teachings of the present invention. Some possible energy modes comprise: storing energy (charging mode 430); operating at least one computer on stored energy (battery mode 420); operating at least one computer on external energy (AC mode 440); and standing by (standby mode 410), for example. The arrows show some possible transitions among modes. For a cluster of servers for example, the decision to enter battery mode 420 may be based on 1) the total AC current draw of all servers, or 2) the cost of energy, or both. The decision to charge a battery (charging mode 430) is based on 1) the cost of energy (utility cost), or 2) when there is not enough stored energy to handle future spikes, or both. Batteries are charged (charging mode 430) when the utility cost is at non-peak, for example. This reduces cost for electricity by collecting energy in the battery when energy is inexpensive, but using the energy (battery mode 420) when it would have been more expensive to buy energy from the utility.

SERVER EXAMPLE 1

The following is a detailed example involving some energy modes and transitions. This example may be considered in conjunction with FIG. 2 and FIG. 4. The example involves a cluster of servers that each have their own batteries. An alternative example would have one battery shared by all servers (like a back-up power supply) and the servers could be individually switched to use AC or use battery. Both alternatives may be useful for building a cluster. For this example, the following definitions, assumptions, and pseudocode will be used.

Definitions (Used Below in The Pseudocode):
  "ac_current": the current draw from the AC supply.
  "ac_limit": a predefined limit that we try to avoid going over.
  "utility cost": the price of electricity at this moment.
  "cost_limit": the predefined limit for utility cost. We try not to use AC when cost_limit is exceeded.
  "node": a server.
  "low battery": a battery that has so little energy left (defined by a predetermined limit) that we do not care to use it.
  "standby mode": This is defined by the server. It is a mode in which the server does not serve requests, but is in a low-energy (or no energy) state and is waiting to be awakened. Some implementations may completely power down the system while it is in "standby".

Assumptions:
1. Batteries are designed to provide the peak power requirements of the server. A server is defined not to draw more current than the battery can supply.
2. The rack is designed so the available AC current is always sufficient to have every node on in standby state or in an on state serving no requests.
3. The rack is not supplied with enough power to run all the servers at their maximum power usage. (This is for economic reasons.)

Pseudocode for Process Flow
1. Start. Go to 2.

Stop using low batteries
2. IF a battery has low battery condition and is being used, THEN goto 3. Else goto 4.
3. Put all servers using this battery into AC mode and put them in standby state. goto 2.

Wake up a Server
4. IF (there exists a server X that is in standby mode) AND (turning on X would not cause ac_current>ac_limit) THEN goto 5. Else go to 6.
5. Put the chosen server into AC mode. Go to 4.

Start Recharging Batteries
6. IF (there is a battery that is not fully charged) AND (said battery is not being used) AND (cost <=cost_limit) AND (charging said battery would not cause ac_current>ac_limit) go to 7. Else go to 8.
7. Begin charging the chosen battery. Go to 6.
8. IF (ac_current>ac_limit) OR (utility cost>cost_limit) THEN go to 9 (Yes). Else goto 14 (No).

Using Too Much Energy

Stop Charging Battery
9. IF there exists a battery that is charging go to 10. Else go to 11.
10. Stop charging the chosen battery. Go to 8.

Start Using Battery
11. IF there exists a node that is using AC and said server does not use a low battery go to 12. Else 13.
12. Put the chosen node into battery mode. Go to 2.

Put Node in Standby
13. Pick a node that is using AC and put it in standby mode. Go to 2.

Using Too Little Energy

Move Server From Battery to AC
14. IF (there exists a server X in battery mode) AND (putting X into AC mode would not cause ac_cluster>limit) THEN go to 15. Else go to 2.
15. Put the chosen node into AC mode. Go to 2.

SERVER EXAMPLE 2

Scenarios for Operating Servers with Batteries

For this example, assume a rack has 100 servers. Each server uses 10 watts (W) at idle (doing no work, but on). Each server uses 30 W maximum (when busy). We define the power limit of the rack to be 1800 W. Each server will use a separate 60 W-h battery (can run for 2 hours on a battery at max power or run for 6 hours while idle.)
Scenario A. All servers are idle (no work to be done). 100 servers run on AC using 100*10 W=1000 W.

Scenario B. All servers are running a medium size workload. Each server uses 15 W.100 servers run on AC using 100*15 W=1500 W.

Scenario C. All servers are running at high workload. Each server uses 30 W. 100 servers running on AC would use 3000 W (above the limit). Therefore our system adapts so that 60 systems run from AC and 40 systems run from battery. This uses 60*30 W=1800 W of AC power. These periods of high workload will last from several minutes to a few hours. If some of the batteries are drained, then these systems are put back on AC power and other servers begin using their charged batteries. If there are no charged batteries, then the cluster will put some nodes into a "standby" state. When a server is put into "standby", it is no longer serving requests from the workload. Since the cluster has a reduced capability with some machines being essentially "off", then techniques like workload re-balancing or request admission control may be used to redistribute the work among the remaining servers. The workload may be reduced by ignoring requests, if necessary.

In conclusion, we have shown examples of methods and systems for supplying energy or managing energy for computers.

One of the preferred implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for energy management, said method comprising:
    determining a value for an energy condition affecting at least one computer in a cluster;
    updating said value continuously;
    comparing said value with a predefined limit regarding said energy condition;
    based on said determining, said updating, and said comparing, utilizing at least one energy mode chosen from:
        storing energy;
        operating said at least one computer on stored energy;
        operating said at least one computer on external energy; and
        standing by; and
    performing said determining, said updating, and said comparing for a plurality of energy conditions.

2. The method of claim 1, wherein said determining further comprises at least one of:
    determining a time of day;
    determining a price of energy;
    determining a rate of energy consumption; and
    determining an amount of stored energy.

3. The method of claim 1, wherein:
    said energy condition is a price for energy; and
    said utilizing further comprises said operating on stored energy, when said price is greater than said predefined limit.

4. The method of claim 1, wherein:
    said energy condition is a price for energy; and
    said utilizing further comprises said staining energy, when said price is less than said predefined limit.

5. The method of claim 1, wherein:
    said energy condition is a price for energy; and
    said utilizing further comprises said operating on external energy, when said price is less than said predefined limit.

6. The method of claim 1, wherein:
    said energy condition is a rate energy consumption; and
    said utilizing further comprises said operating on stored energy, when said rate is greater than said predefined limit.

7. The method of claim 1, wherein:
    said energy condition is a rate of energy consumption; and
    said utilizing further comprises said storing energy, when said rate is less than said predefined limit.

8. The method of claim 1, wherein:
    said energy condition is a rate of energy consumption; and
    said utilizing further comprises said operating on external energy, when said rate is less than said predefined limit.

9. The method of claim 1, wherein:
    said energy condition is an amount of stored energy; and
    said utilizing further comprises said storing energy, when said amount is less than said predefined limit.

10. A tangible system for energy management, said system comprising:
    means for determining a value for an energy condition affecting at least one computer in a cluster;
    means for updating said value continuously;
    means for comparing said value with a predefined limit regarding said energy condition; and
    means, responsive to said means for determining, said means for updating, and said means for comparing for utilizing at least one energy mode;
    means for storing energy; and
    means for operating said at least one computer on stored energy;

further wherein said means for determining, said means for updating, and said means for comparing, are operative for a plurality of energy conditions.

11. The system of claim 10, wherein said means for determining further comprises at least one of:
   means for determining a time of day;
   means for determining a price of energy;
   means for determining a rate of energy consumption; and
   means for determining an amount of stored energy.

12. The system of claim 10, wherein:
   said means for determining further comprises means for determining a price for energy; and
   said means for operating on stored energy is employed when said price is greater than said predefined limit.

13. The system of claim 10, wherein:
   said means for determining further comprises means for determining a price for energy; and
   said means for storing energy is employed when said price is less than said predefined limit.

14. The system of claim 10, wherein:
   said means for determining further comprises moans for determining a price for energy; and
   said utilizing further comprises means for operating on external energy, when said price is less than said predefined limit.

15. The system of claim 10, wherein:
   said means for determining further comprises means for determining a rate of energy consumption; and
   said means for operating on stored energy is employed when said rate is greater than said predefined limit.

16. The system of claim 10, wherein:
   said means for determining further comprises means for determining a rate of energy consumption; and
   said means for storing energy is employed when said rate is less than said predefined limit.

17. The system of claim 10, wherein:
   said means for determining further comprises means for determining a rate of energy consumption; and
   said means for utilizing further comprises means for operating on external energy, when said rate is less than said predefined limit.

18. The system of claim 10, wherein:
   said means for determining further comprises means for determining an amount of stored energy; and
   said means for storing energy is employed when said amount is less than said predefined limit.

19. A computer-usable medium having computer-executable instructions for energy management, said computer-executable instructions comprising:
   means for determining a value for an energy condition affecting at least one computer in a cluster;
   means for updating said value continuously;
   means for comparing said value with a predefined limit regarding said energy condition; and
   means, responsive to said means for determining, said means for updating, and said means for comparing, for utilizing at least one energy mode;
   means for storing energy; and
   means for operating said at least one computer on stored energy;
   wherein said means for determining, said means for updating, and said means for comparing, are operative for a plurality of energy conditions.

20. The computer-usable medium of claim 19, wherein said means for determining further comprises at least one of:
   means for determining a time of day;
   means for determining a price of energy;
   means for determining a rate of energy consumption; and
   means for determining an amount of stored energy.

21. The computer-usable medium of claim 19, wherein:
   said means for determining further comprises means for determining a price for energy; and
   said means for operating on stored energy is employed when said price is greater than said predefined limit.

22. The computer-usable medium of claim 19, wherein:
   said means for determining further comprises means for determining a price for energy; and
   said means for storing energy is employed when said price is less then said predefined limit.

23. The computer-usable medium of claim 19, wherein:
   said means for determining further comprises means for determining a price for energy; and
   said utilizing further comprises means for operating on external energy, when said price is less than said predefined limit.

24. The computer-usable medium of claim 19, wherein:
   said means for determining further comprises means for determining a rate of energy consumption; and
   said means for operating on stored energy is employed when said rate is greater than said predefined limit.

25. The computer-usable medium of claim 19, wherein:
   said means for determining further comprises means for determining ante of energy consumption; and
   said means for storing energy is employed when said rate is less than said predefined limit.

26. The computer-usable medium of claim 19, wherein:
   said means for determining further comprises means for determining a rate of energy consumption; and
   said means for utilizing further comprises means for operating on external energy, when said rate is less than said predefined limit.

27. The computer-usable medium of claim 19, wherein:
   said means for determining further comprises means for determining an amount of stored energy; and
   said means for storing energy is employed when said amount is less than said predefined limit.

* * * * *

UNITED STATES PATENT AND TRADEMARK OFFICE
CERTIFICATE OF CORRECTION

PATENT NO. : 6,966,005 B2 Page 1 of 1
DATED : November 15, 2005
INVENTOR(S) : Patrick Joseph Bohrer and Charles Robert Lefurgy It is certified that error appears in the above-identified patent and that said Letters Patent is hereby corrected as shown below:

<u>Column 8,</u>
Lines 47-50, should read:
4. The method of Claim 1, wherein:
    said energy condition is a price for energy; and
    said utilizing further comprises said storing energy, when said price is less than said predefined limit.

<u>Column 9,</u>
Lines 20-25, should read:
14. The system of Claim 10, wherein:
    said means for determining further comprises means for determining a price for energy; and
    said utilizing further comprises means for operating on external energy, when said price is less than said predefined limit.

<u>Column 10,</u>
Lines 37-41, should read:
25. The computer-usable medium of Claim 19, wherein:
    said means for determining further comprises means for determining a rate of energy consumption; and
    said means for storing energy is employed when said rate is less than said predefined limit.

Signed and Sealed this

Twenty-first Day of March, 2006

JON W. DUDAS
*Director of the United States Patent and Trademark Office*